(12) United States Patent
Madsak et al.

(10) Patent No.: US 7,129,437 B2
(45) Date of Patent: Oct. 31, 2006

(54) METHOD FOR MONITORING A WELDING PROCESS DURING THE WELDING OF STUDS AND DEVICE FOR CARRYING OUT SAID METHOD

(75) Inventors: Jürgen Madsak, Breckerfeld (DE); Ulrich Citrich, Gevelsberg (DE); Eduard Kirchner, Offenburg (DE)

(73) Assignee: Nelson Bolzenschweiss—Technik GmbH & Co. KG, Geverlsberg (DE)

( * ) Notice: Subject to any disclaimer, the term of this patent is extended or adjusted under 35 U.S.C. 154(b) by 294 days.

(21) Appl. No.: 10/477,875

(22) PCT Filed: May 15, 2002

(86) PCT No.: PCT/DE02/01738

§ 371 (c)(1),
(2), (4) Date: Mar. 26, 2004

(87) PCT Pub. No.: WO02/092271

PCT Pub. Date: Nov. 21, 2002

(65) Prior Publication Data

US 2004/0149695 A1    Aug. 5, 2004

(30) Foreign Application Priority Data

May 16, 2001  (DE) .............................. 101 24 088

(51) Int. Cl.
*B23K 9/20* (2006.01)
(52) U.S. Cl. ......................................... 219/99; 219/98
(58) Field of Classification Search .................. 219/98, 219/99
See application file for complete search history.

(56) References Cited

U.S. PATENT DOCUMENTS

| 5,321,226 | A | * | 6/1994 | Raycher | 219/98 |
| 5,406,044 | A | * | 4/1995 | Killian et al. | 219/99 |
| 5,977,506 | A |   | 11/1999 | von Daniken |  |
| 6,011,234 | A | * | 1/2000 | Kirchner et al. | 219/98 |

FOREIGN PATENT DOCUMENTS

| DE | 4314528 | A1 | * | 11/1994 |
| DE | 4437264 | A1 | * | 4/1996 |
| EP | 0816005 | A2 | * | 1/1998 |
| WO | WO01/76800 | A1 | * | 10/2001 |

OTHER PUBLICATIONS

English abstract for German document No. DE20006636U1.*

* cited by examiner

*Primary Examiner*—Clifford C. Shaw
(74) *Attorney, Agent, or Firm*—Gifford, Krass, Groh, Sprinkle, Anderson & Citkowski, P.C.

(57) ABSTRACT

The invention relates to a method of monitoring the welding operation in a stud welding process, wherein a part (19) to be welded is immersed into the melt by moving the part (5) towards a workpiece (17), with a physical quantity depending on the force required for moving the part (5) being measured at least during the phase of immersion of the part (19) to be welded into the melt and the measured gradient of the physical quantity plotted against time being compared with a predetermined set gradient. Furthermore, the invention relates to a stud welding device for carrying out such a method.

8 Claims, 3 Drawing Sheets

METHOD FOR MONITORING A WELDING PROCESS DURING THE WELDING OF STUDS AND DEVICE FOR CARRYING OUT SAID METHOD

BACKGROUND OF THE INVENTION

The invention relates to a method of monitoring the welding operation in a stud welding process and a device for carrying out the method.

When carrying out a stud welding process, in order to obtain the best possible welding quality, it is necessary to observe the set values of relevant welding parameters with corresponding accuracy. In the stroke ignition method and in similar methods which the present invention relates to, the parameters welding current, welding time, length of projection, stroke or lifting-off distance when drawing the arc, and dampening during immersion in particular are decisive for the quality of the welding connection between the stud and the workpiece.

Measuring and monitoring the electric parameters, namely, the welding current and the welding voltage, has been known and commonly applied for quite a long time, but particularly in case of the stroke ignition method, observing the mechanical parameters such as the length of projection, the lifting-off distance and immersion dampening, has only been made possible by pre-adjusting these parameters in the stud welding device or the corresponding welding head.

What is disadvantageous here, however, is that the movement of the stud of known stud welding devices inserted into the welding head is not monitored and thus deviations of the movements from predetermined set values are not detected. This means that a negative influence on the welding quality resulting from the fact that a predetermined length of projection or lifting-off distance was not observed, or deviations from the set value of dampening during immersion are not detected.

In order to solve this problem in the tip ignition welding process, the German patent DE 41 24 511 C1 proposes that the actual value of the immersing speed of the welding stud into the welding pool that is created at the point of welding of the workpiece be measured and compared with a set value for the speed obtained empirically. Deviations of the actual value from the set value which are outside a predetermined range of tolerances then show the insufficient quality of the welding connection that has been completed. As the immersing speed is the decisive parameter for the welding quality in the tip ignition welding process, the document DE 41 24 511 C1 proposes that this value be determined by measuring the time which the welding stud requires in order to cover a short distance Δs immediately before it is immersed into the melted mass of the workpiece.

In the stroke ignition welding process, however, the quality of a welding connection does not only depend on the immersing speed, but also on the dampening during immersion, which means that what is decisive is the time gradient of the movement of the stud or the time gradient of the stud speed from the point of time when it is immersed into the melt. Furthermore, it is desirable to monitor the observance of the predetermined parameters "length of projection" and "lifting-off distance", because they have an influence on both the stud speed during the phase when it is immersed into the melt and on the behaviour of the electric arc.

From the documents DE 39 29 669 A1 and DE 43 07 325 A1, stud welding devices are known, respectively, whose aim it is to effect a movement of the moving part assembly (which comprises all moving parts that cooperate to perform the actual welding movement such as the stud holding device, the charging head, the feed cylinder, the feed piston, etc.) or of the stud holding device as exactly as possible and in line with a predetermined course. For this purpose, in the device according to DE 39 29 669 A1, a control magnet is connected with a path measuring device and an electronic control in order to thereby determine the actual value of the regulating distance of the armature of the control magnet, to compare it with a set value and to effect control of the movement of the armature with which the moving part assembly is connected. In the device according to the document DE 43 07 325 A1, the moving part assembly or the stud holding device of the welding gun is moved with the aid of a lifting magnet which acts as a controlled brake so that no additional damping units or devices are required. What is disadvantageous in these devices, however, is that insufficient welding quality of completed welds is not recognizable if—for whatever reasons—the course of welding deviates from an ideal or predetermined course.

For this reason, in the document DE 43 14 528 C2, it is proposed to continuously measure the time gradient of the movement of the stud towards the workpiece, at least during the entire phase of movement when the stud is immersed into the melt of the workpiece. Hereby, deviations of the measured course of movement or of the time gradient of the speed of movement determined therefrom from a predetermined set value for the course or the gradient can be detected.

In spite of this well-tried method, in practice, there was an increased demand for more exact and more detailed information about the quality of a weld, particularly in case of aluminium welding.

SUMMARY OF THE INVENTION

Thus, the object of the invention is to provide a method of monitoring the welding operation in a stud welding process which improves the control of the quality of a welding connection completed and which increases the sensitivity or the exactness of quality control. Furthermore, it is an object of the invention to provide a device for carrying out this method.

With analogous or digital (continuous or, with predetermined sampling frequency, discrete) detection or measurement of the force required—or of a physical quantity clearly mathematically dependent thereon—for the movement of the part (such as the moving part assembly of a welding gun or the welding axle of a welding head) at least during the phase of immersion of the part to be welded or the stud into the melt, it is now possible to monitor the process of immersion in a more detailed way; here, even such parameters as the viscosity of the melt etc. are included in the quality information about the weld, as the force required increases with reduced viscosity. For this purpose, in order to assess the quality of the weld, the measured gradient of the force required is compared with a predetermined set value for this gradient. In this way, actual curves can be determined which, even in case of little changes of the path taken, provide much more sensitive and thus more detailed or more exact information about this important phase of a welding operation compared to path measurement (a curve plotting path against time). In particular, it is possible to assess the quality of a weld by making a comparison with a set curve determined, with potentially additional tolerance, and to make a reliable statement whether the weld obtained meets the predetermined demands.

Advantageously, the force required can be detected via a signal thereon dependent, namely, the power consumption or input of the electric drive of the movable part or the moving part assembly (welding axle). Of course, it is conceivable to determine the force required via a signal thereon dependent which is obtained by means of other sensors (such as mechanical, optical or electrical ones) and by a corresponding evaluation.

Advantageously, a welding device with an electric drive, particularly a servoelectric drive, does not require an additional sensor because a signal, namely, the electric power consumption of the drive, already exists here, and this signal only has to be transmitted to a corresponding evaluation and control unit. Here, even already existing stud welding devices can be retrofitted in a simple manner, as tapping off the current and/or the voltage of the electric drive is not very complicated to effect and old measuring and evaluation units can be replaced or retrofitted, or new measuring and evaluation units can be added.

Of course, it is sufficient to determine and to monitor one signal or parameter only, which the force required is unambiguously dependent on. For example, if the voltage is constant, it is sufficient to determine or measure the power consumption of the electric drive, as the force directly depends on the power consumption and, in case of constant voltage, the latter depends on the current consumption or input.

In a preferred embodiment of the invention, if predetermined tolerances are exceeded, a failure signal can be produced and the failure can be indicated optically or acoustically. In hand-held tools, for example, a failure can advantageously be indicated at the welding head or at the welding gun by means of an indicating unit or at another arbitrary place of the welding device, with even a central display being possible.

In another embodiment of the invention, the set course or gradient and/or the predetermined tolerances may depend on the energy supplied during the welding operation, particularly the welding current, and other parameters such as the thickness, the material of the workpiece, the type of stud (thickness, material, length, shape, cross-section) etc. Set courses or gradients of this kind may be determined mathematically or empirically in tests and may be stored in a data storage medium, particularly of the measuring and evaluation unit, in such a way that they can be chosen and fetched from the storage medium.

In a further embodiment of the invention, the measured time gradient of the force is logged and/or stored so that the information about the quality of the weld is not only available during or shortly after the welding operation (for example, using a temporary storage medium), but is advantageously stored at least in a spot-checking-way or as an entire data set in order to make it possible to make statements about individual welds or all welds in retrospect. For example, particularly in case of welds for which safety is an important aspect, the quality of the weld can be checked or proved subsequently with the aid of a welding protocol.

In addition, it is conceivable to determine the movement of the part to be moved, particularly the moving part assembly or the welding axle (as suggested in document DE 43 14 528 C2, for example) with a path measuring unit and to evaluate it with respect to the quality of the weld as a further parameter (depth of immersion, lifting-off distance etc.) in addition to the force applied and to use it for controlling the movement.

It is of course also possible to use the (negative) acceleration or the braking of the part to be moved, particularly during the phase of immersion, as a further parameter to improve the assessment or evaluation of the quality of the weld additionally or instead of the parameters described above. The negative acceleration or an acceleration curve can be calculated via a path measuring unit and by making a corresponding differentiation of the path measured during a certain period of time, or it can advantageously be determined in a simple and quick manner directly during the movement, particularly during the phase of immersion, with the aid of an acceleration sensor.

Moreover, it is conceivable to classify the determined actual courses or gradients potentially together with other parameter curves, such as the curve plotting path against time, the curve for the welding current, the curve for the electric arc voltage, the acceleration curve, etc. of a welding operation, particularly the phase of immersion, and with parameters such as the lifting-off-distance, the type of workpiece, the type of stud, etc. With the aid of such a classification, it is advantageously possible to determine set curves for a process control which can be used for controlling welding operations. For this purpose, the measuring and evaluation unit may additionally be configured as a control unit, or the signal evaluated may be transmitted to an independent control unit which controls the drive of the welding axle or the moving part assembly and/or the arm of a robot in dependence on the signal evaluated (open-loop control) and effects control (closed-loop control) in accordance with set values or curves which can be predetermined (as compared to actual values detected, respectively).

Further embodiments of the method according to the invention and of the device according to the invention are apparent from the subclaims.

BRIEF DESCRIPTION OF THE DRAWINGS

The invention is now described in greater detail with the aid of an embodiment shown in the drawings, in which.

DETAILED DESCRIPTION OF THE INVENTION

Figure 1:
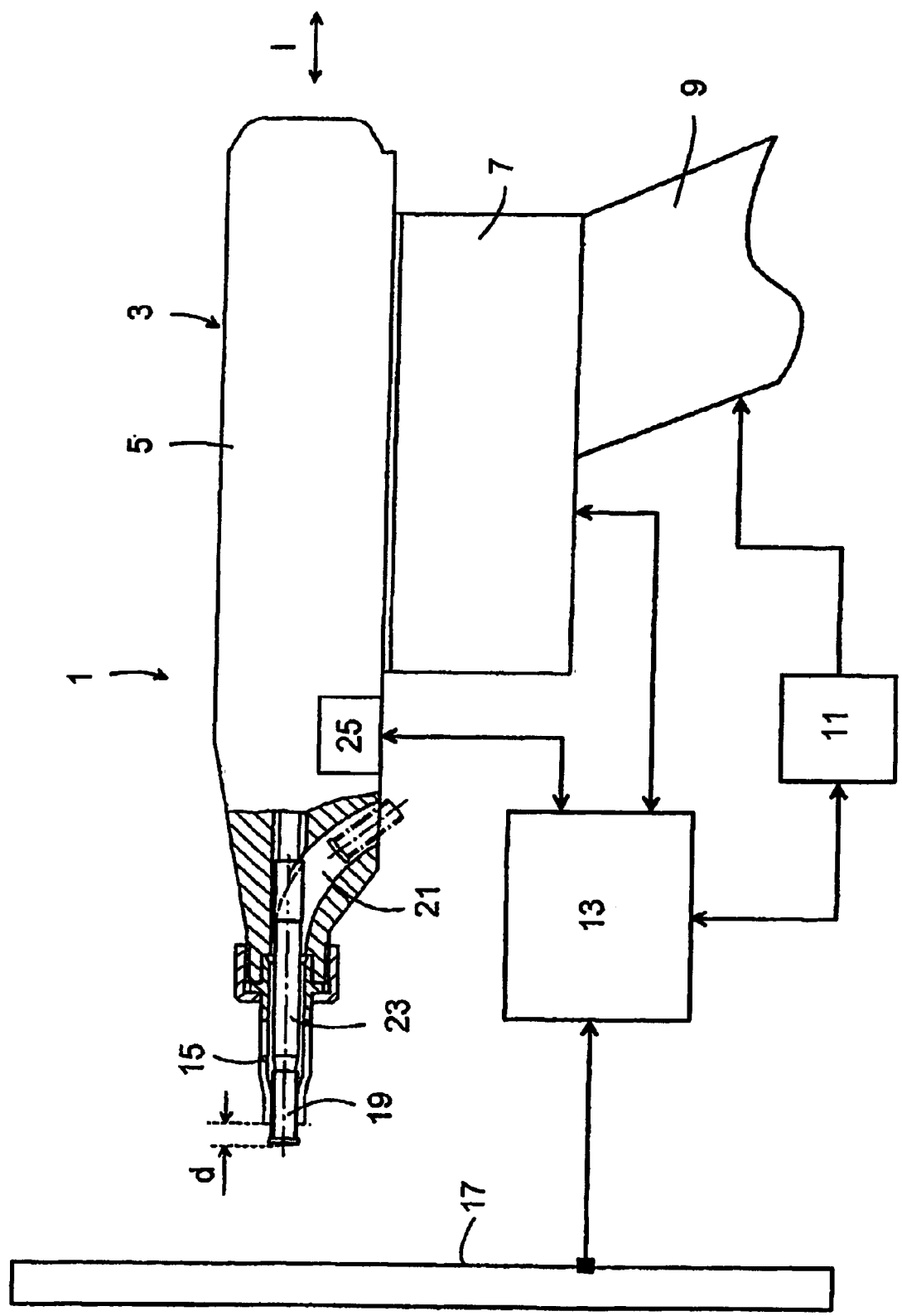
FIG. 1 shows a schematic view of a stud welding device according to the invention.

FIG. 1 shows a stud welding device 1 which comprises a stud welding head 3 which in turn consists of the actual welding axle 5 and an electric drive 7, particularly a servoelectric drive such as a linear motor, in order to move the welding axle 5 in the axial direction (arrow I in FIG. 1).

The entire welding head 3, which is substantially embodied in a generally known way as a welding head that is suitable for carrying out the stroke ignition welding process, may be arranged at the arm 9 of a robot, as indicated in FIG. 1, with which the welding head 3 can be moved in one or several three-dimensional axes.

Both the drive 7 for the welding axle 5 and a drive 11 for the arm 9 of the robot are controlled by means of an evaluation and control unit 13.

The evaluation and control unit 13 can additionally take over (in a way not shown) the further controlling operations of the welding head 3 inasmuch as the control of the welding current is concerned. As the present invention substantially relates to a movement of the welding head 3 or of a stud holding device 15 of the welding axle 5, the illustration of further components of the stud welding device 1 was relinquished.

FIG. 1 also shows a workpiece 17 onto which a part (stud) 19 to be welded which is held in the stud holding device 15 is to be welded. The workpiece 17 is electrically contacted with the evaluation and control unit 13. This is not only necessary to make the welding current flow during the welding operation, but it is also advantageous for detecting an electric contact 32 between the stud holding device 15 or the part 19 to be welded and the workpiece 17.

FIG. 1 furthermore shows that parts 19 to be welded can be supplied to the welding axle 5 of the stud welding head 3 by means of an automatic feeding device which is not shown in greater detail. This is done by means of a supply channel 21 in the front portion of the welding head 3 which is connected with the automatic feeding device in a commonly known way using a tube (not shown).

Feeding or supplying a part 19 to be welded is effected using blast air, whereby the part to be welded is moved into the front portion of the stud welding head 3 via the supply channel 21. In this position, the part to be welded substantially already lies on the axis of the welding axle 5 or the stud holding device 15. Then, the part 19 to be welded is pushed through the stud holding device into the front portion thereof by means of a charging pin 23 to assume an axial position in which it is possible to weld the part 19. For this purpose, the part 19 of course has to project from the face of the stud holding device by a predetermined length of projection d. The charging pin 23 is acted upon by a drive 25 which is only shown schematically in FIG. 1 and which is usually embodied as a pneumatic drive. The drive 25 makes it possible to move the charging pin 23 between a front position in which the face of the charging pin 23 acts upon the backside of the part 19 to be welded, and a withdrawn position in which the front portion of the charging pin 23 is withdrawn to such an extent that the supply channel 21 for supplying a part to be welded is exposed. The drive 25 is controlled by the measuring, evaluation and control unit 13, as well.

In the following, the stud welding method according to the invention is explained in greater detail with the aid of a device shown in FIG. 1.

Figure 2:
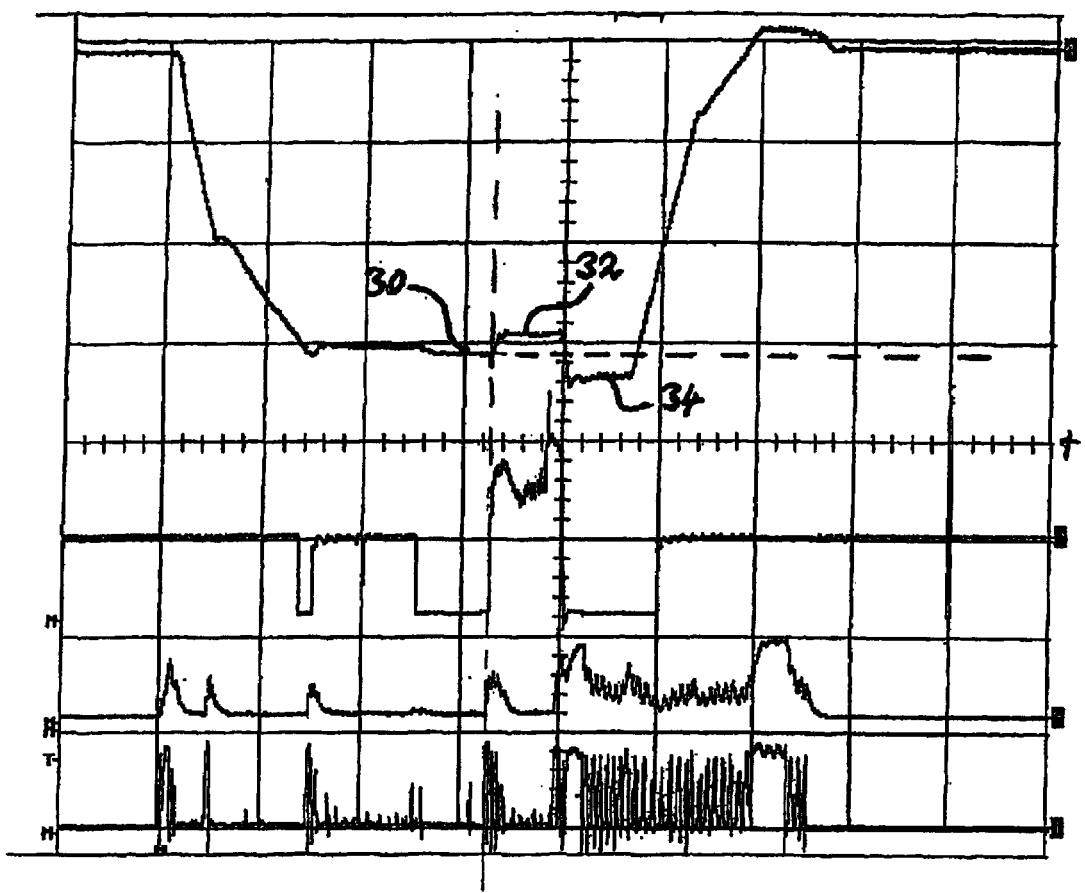
FIG. 2 shows a diagram of different signals during a welding operation carried out with a stud welding device according to FIG. 1 and FIG. 3 an enlarged partial view of the diagram according to FIG. 2.

In the diagram in FIG. 2, typical curves of an entire welding operation are illustrated, with the following information being provided:

Curve 1: Current gradient of the servoelectric drive 7 without a smoother Curve 2: Gradient of the electric arc voltage Curve 3: Current gradient of the servoelectric drive 7 with a smoother (RC)

Curve 4: Course of the path travelled

Curve 4 shows a curve plotting path against time which is typical of a stud welding operation working with the stroke ignition method. Here, the welding axle 5 is moved from a starting position ($1^{st}$ quadrant) towards the position of the workpiece 17 as far as the touching point 30 ($2^{nd}$ quadrant to the middle of the $4^{th}$ quadrant). Here, the lifting-off-distance 32 and the depth of immersion 34 are calculated or determined. When the tip of the stud 19 is lifted off the workpiece, the electric arc voltage (curve 2) increases from zero (switching on the pre-current) and reaches its maximum in the course of the adjustment of the lifting-off-distance 32. Furthermore, the welding axle 5 is moved towards the workpiece 17 together with the stud 19 again, and the tip of the stud 19 is immersed into the melt produced by the electric arc and is moved further until a depth of immersion 34 which can preferably be predetermined is reached.

Further details not relating to the phase of immersion, such as overshooting, bouncing and the like, are not discussed here, as they are not of great importance to the method according to the invention. Further effects or deflections which are not important to the invention—apart from errors of measurement—are based on PWM control (pulse width modulation) of the servoelectric drive 7 as well as a potential transient response of the path control (lifting-off distance, depth of immersion, etc.). In addition to effects caused by control (stopping), a certain amount of overshooting or undershooting in the current gradient of drive 7 is also caused by the inertia of masses of the parts moved (basically the welding axle 5, the stud 19, the stud holding device 15) and, as the case may be, gravity (in case the welding position is not horizontal, such as during overhead welding); thus, after the inertia of masses has been surmounted (increase in current with overshooting), the part to be moved or the welding axle 5 moves further automatically and may cause a certain "generator effect" (decrease in current up to negative under-shooting).

Figure 3:
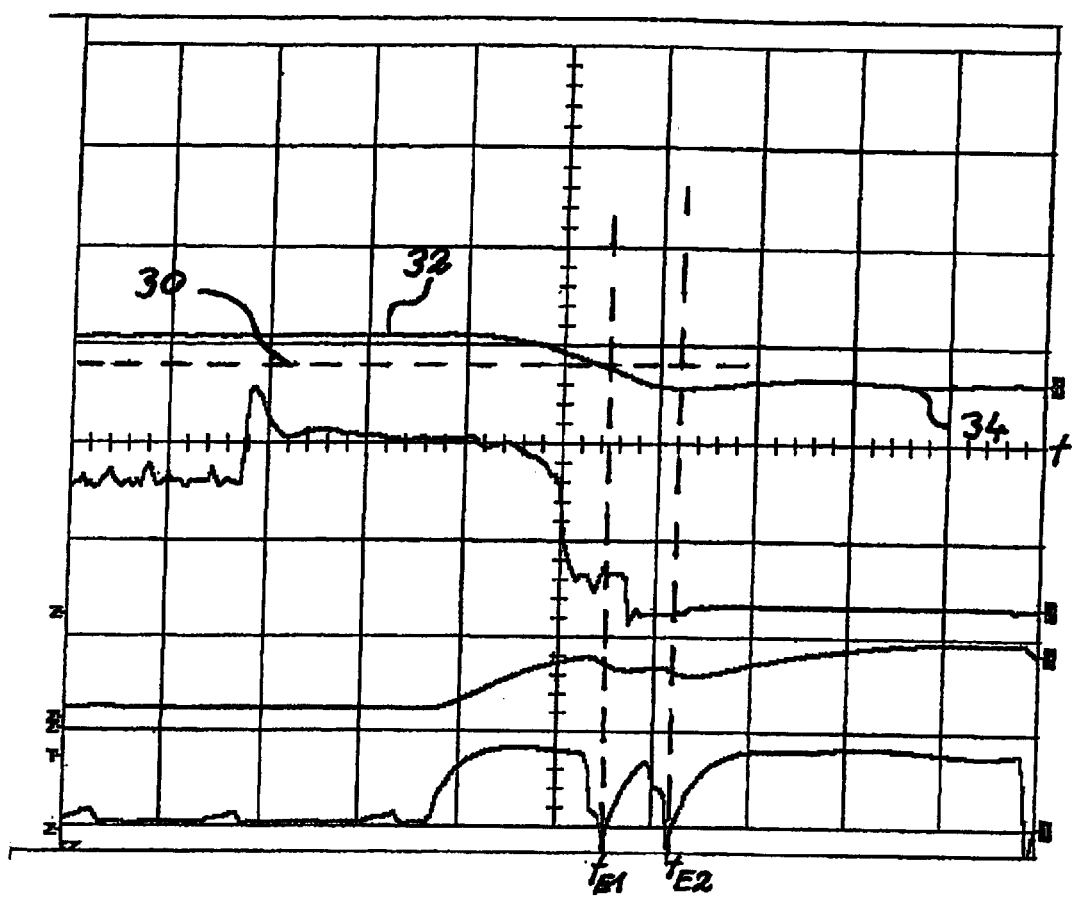

FIG. 3 shows an extract of the $5^{th}$ and $6^{th}$ quadrants (left and right quadrant of the ordinate) according to FIG. 2 which has been extended in the direction of the absciss (axis of time), which will be discussed in greater detail subsequently.

The dashed line drawn into the diagram as an optical guideline near curve 4 (gradient or course of the path travelled plotted against time) shows that the tip of the stud is immersed into the melt at the point of time $T_{E1}$. As will be apparent from curve 3 and particularly curve 1, at this point of time, the current consumption of the servoelectric drive 7 increases. In one example of a control operation, the current may be limited to a specific current intensity (such as 50% or 70% of the maximum current intensity) after a speed that can be predetermined has been reached (set value), so, at the point of time of immersion into the melt, the current consumption increases because of a stopping or slowing down effect so that the set value for the speed is reached again.

In the course of further immersion into and penetration of the melt, however, the current consumption may drop again because of effects such as a higher viscosity of the melt after the cooled surface has been surmounted or the resistance by the surface tension has been surmounted. When the tip of the stud further penetrates the melt, however, the current consumption may increase again at the point of time $T_{E2}$ because of increasing resistance resulting from decreasing viscosity of the melt (cooling and depth of the melt) until the depth of immersion 34 is reached and the current for drive 7 can be switched off.

In practice, it has been observed that this curve, particularly the first rise (between $T_{E1}$ and $T_{E2}$) and the potential drop after immersion into the melt, is particularly telling with respect to the quality of the weld, because the condition of the melt, particularly the viscosity thereof, contributes to the course of the curve (curve 1) as a decisive parameter. Thus, according to the invention, set curves with potential tolerances can be created by calculation or in several tests, e.g. by obtaining the mean value or average value, preferably in dependence on the workpiece, the type of stud, the welding current and the welding position, within which an actual gradient of a weld with sufficient quality has to range.

Here, it is advantageously possible to define a threshold value for the drive current; as soon as this value has been reached—with a predetermined additional delay, as the case may be—, the drive current is switched off. Hereby, damage or a change of the position such as the displacement of the workpiece and/or the welding device can be avoided.

Of course, the curves illustrated only constitute examples, and their course largely depends on manufacturing parameters (such as the type of stud, the workpiece, the type of weld etc.). However, tests have shown that characteristic (set) curves may be obtained for different conditions, which make it possible to make a clear assessment of the quality of a weld.

In a further embodiment of the invention, different events such as "immersing $T_{E1}$" may be detected not by an additional path measuring unit but by evaluating curve 3 or, preferably, curve 1 and by searching for concise events such as the first positive slope after the lifting-off-distance has been reached or after continued current consumption (for lifting-off distance and drop), or the course and duration of the corresponding curve segments, etc.

In addition, it is conceivable to use the result of evaluation for controlling (open- or closed-loop control) the drive 7, preferably by means of digital control, so that predetermined set values or set curves including tolerance can be defined and that the quality of the weld can be assessed in accordance with the invention.

For example, in case of a large number of welds made, it is possible hereby to examine only those welds for their quality in additional operations which have been found—with the aid of direct failure indication or a corresponding protocol—to be potentially faulty, i.e. beyond the tolerance of the set curve, and which have therefore been found not to be sufficiently durable, for example. Particularly in case of aluminium welding, manufacturing time and costs are reduced to a considerable extent, because here all welds had to be subsequently examined for durability—for example manually using a cordless screw driver—by now.

Furthermore, it is conceivable to examine and classify the actual courses or gradients detected, potentially together with further parameter curves, such as the curve for the path plotted against time, the curve for the welding current, the curve for the electric arc voltage, etc. of a welding operation, particularly the phase of immersion, and parameters such as the lifting-off-distance, the type of workpiece and stud etc. with respect to characteristic properties which are decisive for the quality of a weld. With the aid of such classification, it is advantageously possible to determine set curves for a process control (open- or closed-loop control) with which welding operations can be controlled. For this purpose, the measuring and evaluation unit may additionally be configured as a control unit, or the signal evaluated may be supplied to an independent control unit which effects control of the drive of the welding axle or the moving part assembly and/or the arm of a robot in dependence on the signal evaluated (open-loop control) and (in comparison with actual values detected) effects control in accordance with set values or curves that can be predetermined (closed-loop control).

Of course, the method according to the invention and the device are not limited to the embodiment shown, but can be used in arbitrary stud welding methods (stroke ignition method, tip ignition method, etc) with arbitrary stud welding devices (welding head of an automatic machine or of the arm of a robot, welding gun, etc.). Here, the term "stud" according to the invention is not to be interpreted in a narrow sense, but in a broad sense, which means that any arbitrary part to be welded which is to be welded to a workpiece with one end or one side thereof is included in this term.

The invention claimed is:

1. A method of monitoring the welding operation in a stud welding process, including the steps of:
    immersing a part to be welded into the melt by moving the part towards a workpiece;
    measuring a physical quantity depending on the force required for moving said part at least during the phase of immersion of said part to be welded into the melt; and
    comparing the measured gradient of the physical quantity plotted against time with a predetermined set gradient.

2. A method according to claim 1, including the step of measuring as the physical quantity, the power consumption (curve 1) of an electric drive for moving said part.

3. A method according to claim 1, including the step of producing a failure signal if predetermined tolerances are exceeded, and indicating the failure is indicated optically or acoustically.

4. A method according to claim 1, including the step of correlating the set course or gradient and the predetermined tolerances based upon the energy that is supplied during the welding operation.

5. A method according to claim 1, including the step of storing the measured time gradient of the physical quantity.

6. A stud welding device for monitoring the welding operation in a stud welding process, comprising:
    a welding head with a controllably movable part at which a stud holding device for receiving a part to be welded is arranged;
    a measuring and evaluation unit to which, in order to detect the force required for moving said controllably movable part, a signal is supplied which depends on the force required; and
    said measuring and evaluation unit detects the time gradient of the signal at least during the entire phase of movement towards immersion of the stud in the melt and compares the time gradient (curve 1) of the signal with a predetermined set gradient, thereby assessing the quality of the welding connection.

7. A stud welding device according to claim 6, wherein said welding head comprises an electric drive for moving said part and that the power consumption of said electric drive serves as the signal that depends on the force required.

8. A measuring and evaluation unit for a stud welding device according to claim 6, whereby a physical quantity depending on the required force of said drive can be measured by means of the measuring unit and compared with a set curve which can be predetermined.

* * * * *